S. H. Wheeler,
Feed-Water Apparatus for Steam Boilers,
N°44,922. Patented Nov. 1, 1864.

Witnesses
R. T. Campbell
C. Schafer

Inventor
S. H. Wheeler
by his Atty,
Mason, Fenwick & Lawrence

UNITED STATES PATENT OFFICE.

S. H. WHEELER, OF DOWAGIAC, MICHIGAN, ASSIGNOR TO HIMSELF, RICHARD HEDDON, ROBERT TUTTLE, AND P. D. BECKWITH, OF SAME PLACE.

IMPROVEMENT IN BOILER-FEEDERS.

Specification forming part of Letters Patent No. 44,922, dated November 1, 1864.

*To all whom it may concern:*

Be it known that I, S. H. WHEELER, of Dowagiac, Cass county, State of Michigan, have invented a new and Improved Feed-Water Apparatus for Steam-Boilers; and I do hereby declare that the following is a full, clear, and exact description thereof, reference being had to the accompanying drawings, making a part of this specification, in which—

Figure 1:
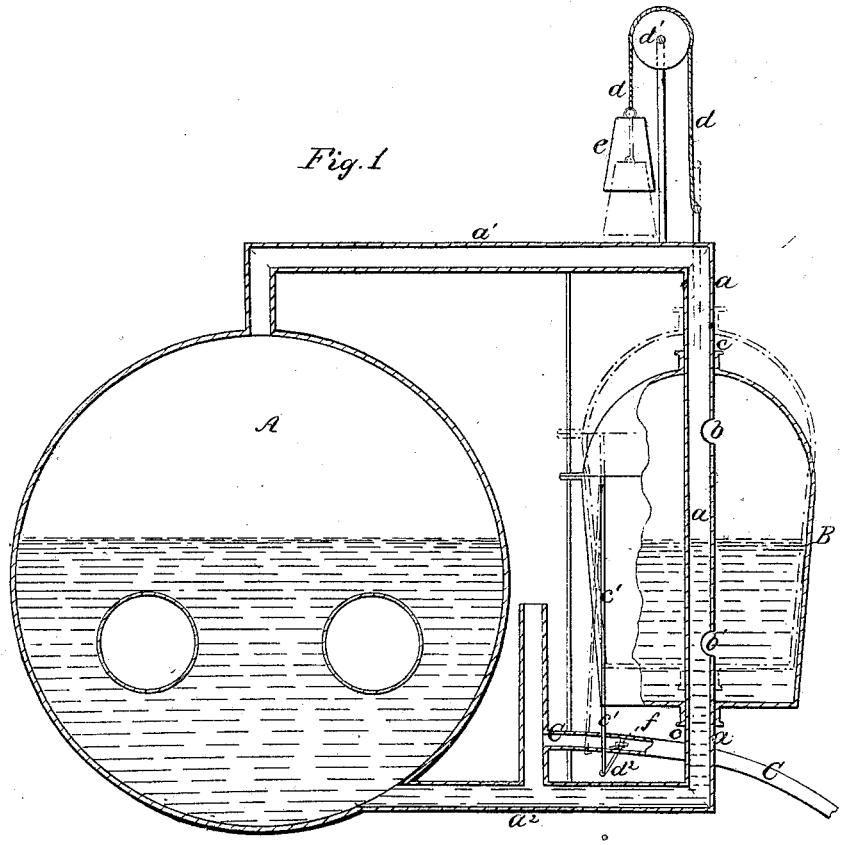
Figure 2:
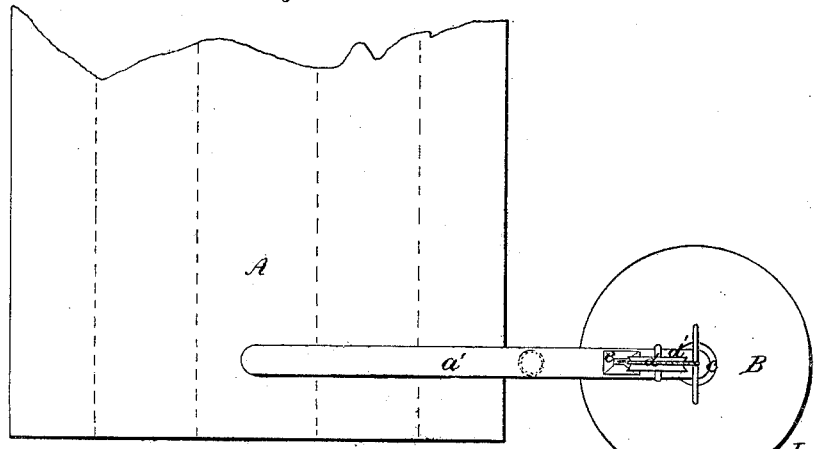

Figure 1 is a vertical sectional elevation of my invention applied to a steam-boiler. Fig. 2 is a top view of Fig. 1.

Similar letters of reference indicate corresponding parts in the several figures.

The object of this invention is to keep up a uniform quantity of water in steam-boilers as far as practicable by means of a vessel of water arranged outside of and communicating with the interior of the boiler in such manner as to rise and fall automatically and to open and close the valve in the feed-pipe, as will be hereinafter described.

To enable others skilled in the art to make and use my invention, I will describe its construction and operation.

In the accompanying drawings, A represents a steam boiler of the ordinary construction, and B represents a vessel of any suitable capacity for containing water, which is to be transferred to the boiler A. Through the center of the vessel B passes a vertical pipe, $a$, which communicates with the interior of this vessel through the two openings $b\ b'$, and which also communicates with the boiler A through the two horizontal pipes $a'\ a^2$, one of which leads into the bottom of the boiler, while the other leads from the top of the boiler into the top of the vessel B, as clearly shown in Fig. 1. The vessel B should be of sufficient strength to resist the pressure of the steam, which has a free communication with it from the boiler, through the steam-pipe $a'$; and this vessel should be so applied to the vertical pipe $a$ passing through it that it will freely rise and descend without leaking materially at the joints $c\ c$. This vessel B is suspended by a chain, $d$, which passes over a pulley, $d'$, and carries on its opposite end a weight, $e$, by means of which latter the vessel B is caused to rise as the water gradually flows from it into the boiler A to preserve a uniform level in said boiler. Vessel B is connected, by means of a rod, $c'$, to the crank-arm $d^2$ of a valve, $f$, which latter is arranged in the feed-pipe C, and by the rising and falling movements of said vessel this valve is operated and the supply of water is caused or checked. When water is supplied to the vessel B or boiler A by any suitable method now practiced in the art to which my invention appertains, it will be evident that there will be an equilibrium between the two vessels; or, in other words, that the water will always preserve the same level in both the boiler and movable vessel, there being a free communication between them, and whatever may be the pressure of steam in one vessel the same pressure will be preserved in the other. The weight $e$, which operates by its gravity to raise the vessel B, is only counterbalanced when the greater quantity of water is in this vessel and boiler. When this is the case, the vessel B will be at its lowest point and the supply of water through feed-pipe C will be cut off, as represented in black lines, Fig. 1. As the water in the boiler A is converted into steam, that which is in the vessel B will flow in to supply its place, and as the water leaves this vessel B and it becomes lighter the weight $e$ will cause it to rise until it reaches a certain point, when the valve $f$ will open and admit of a fresh supply of water to this vessel, causing it to descend until said valve is again closed and the further supply cut off.

Instead of constructing the feeder or water vessel B to rise and fall on the pipe $a$, said vessel may be secured permanently to the pipe $a$, and the horizontal pipes $a'\ a^2$ provided with flexible joints, so that the whole will rise and fall automatically in the operation of feeding the boiler and opening or closing the valve in the feed-pipe. With this arrangement the feed-pipe, and also the pulley $d'$, should not move, but have some established place, so that the weight $e$ can operate on the vessel B and elevate it as its contents diminish. By either arrangement it will be seen that I can always maintain a certain quantity of water in the boiler whether the engine be in motion or at rest, for however rapidly the water in the boiler is consumed the supply will be in the same ratio—*i. e.*, in proportion to the consumption of water in the boiler the feeding-vessel will be elevated by the gravity of the load supporting it and the water in both vessels will maintain a constant level, which is represented by the water-line in Fig. 2.

I am aware that floats or buoys have been used within steam-boilers, and also within vessels arranged outside of the boilers and communicating therewith by means of steam and water pipes; but in all such devices for supplying water to boilers the operation depends upon the rising and falling of the water in the boilers or in the vessels outside of them, and hence the water does not maintain a constant or uniform level at all times, but by my invention the vessel containing the feed-water is caused to rise and thus empty its water into the boiler as rapidly as the water in the boiler is converted into steam and consumed.

Having thus described my invention, what I claim and desire to secure by Letters Patent, is—

The apparatus, constructed as herein described, for maintaining a constant level of water in steam-boilers at all times, as far as practicable, this apparatus being applied on the outside of the boiler, and communicating with the water and steam spaces of the boiler-chamber, and also with a supply-reservoir, and operating substantially as set forth.

S. H. WHEELER.

Witnesses:
STRAWTHER BOWLING,
UZZIEL PUTNAM, Jr.